(12) United States Patent
Greve

(10) Patent No.: US 11,442,130 B2
(45) Date of Patent: Sep. 13, 2022

(54) ROTATIONALLY PHASED DIRECTIONAL ANTENNA

(71) Applicant: Video Aerial Systems, LLC, Madison Heights, VA (US)

(72) Inventor: Charles A. Greve, Amherst, VA (US)

(73) Assignee: VIDEO AERIAL SYSTEMS, LLC, Madison Heights, VA (US)

(*) Notice: Subject to any disclaimer, the term of this patent is extended or adjusted under 35 U.S.C. 154(b) by 0 days.

(21) Appl. No.: 15/913,912

(22) Filed: Mar. 6, 2018

(65) Prior Publication Data

US 2019/0339348 A1 Nov. 7, 2019

(51) Int. Cl.
| | |
|---|---|
| *H01Q 15/16* | (2006.01) |
| *H01Q 21/00* | (2006.01) |
| *G01S 3/40* | (2006.01) |
| *H01P 1/17* | (2006.01) |
| *H01Q 1/14* | (2006.01) |

(52) U.S. Cl.
CPC .............. *G01S 3/40* (2013.01); *H01P 1/173* (2013.01); *H01Q 15/168* (2013.01); *H01Q 1/14* (2013.01)

(58) Field of Classification Search
CPC ... G01S 3/40; H01P 1/17; H01P 1/173; H01Q 15/16; H01Q 15/168; H01Q 1/14; H01Q 13/06; H01Q 13/065; H01Q 1/28; H01Q 1/282; H01Q 21/00; H01Q 21/06; H01Q 21/24; H01Q 21/245; H01Q 5/37; H01Q 5/371; H01Q 9/30
See application file for complete search history.

(56) References Cited

U.S. PATENT DOCUMENTS

| | | | | |
|---|---|---|---|---|
| 4,186,403 A | * | 1/1980 | Dome | H01Q 9/28 343/801 |
| 8,717,250 B2 | * | 5/2014 | Nilsson | H01Q 19/17 343/893 |
| 2007/0069970 A1 | * | 3/2007 | Argaman | H01Q 15/168 343/840 |
| 2014/0028516 A1 | * | 1/2014 | Semonov | H01Q 21/26 343/798 |

* cited by examiner

*Primary Examiner* — Tho G Phan
(74) *Attorney, Agent, or Firm* — Rupak Nag

(57) ABSTRACT

Circularly polarized directional antennas and methods of fabrication are provided. An antenna comprises conductive elements above a conductive reflector. The conducting elements are spaced radially outward from the center axis. The elements may be spaced equidistantly about each other or may be spaced between 10 and 80 degrees apart. The elements may be straight or curved. The elements may be a parallel to the reflector or may curve away or toward the reflector. The lengths and widths of each conductive element are adjusted to create or receive a circularly polarized wave of particular rotation based on the location in the element system. The elements are located within a printed circuit board that is bonded to a coaxial cable feedline placed above a metallic reflector. Each conducting element comprises a metallic wire.

12 Claims, 5 Drawing Sheets

ROTATIONALLY PHASED DIRECTIONAL ANTENNA

TECHNICAL FIELD

The present disclosure relates generally to antenna systems, and more specifically to circularly polarized directional antennas for uses including video piloting, drone vehicles (aircraft and ground), UAVs, mesh networking, and Wi-Fi applications.

BACKGROUND

Antennas are electrical devices which convert electric power into radio waves, and vice versa. They are usually used with a radio transmitter or radio receiver. In transmission, a radio transmitter supplies an electric current to the antenna's terminals, and the antenna radiates the energy from the current as electromagnetic waves (radio waves). In reception, an antenna intercepts some of the power of an electromagnetic wave in order to produce an electric current at its terminals, and is applied to a receiver to be amplified.

Typically an antenna consists of an arrangement of metallic conductors (elements), electrically connected (often through a transmission line) to the receiver or transmitter. Antennas may also include additional elements or surfaces with no electrical connection to the transmitter or receiver, such as parasitic elements, parabolic reflectors, flat reflectors or horns, which serve to direct the radio waves into a beam or other desired radiation pattern.

Antennas can be designed to transmit and receive radio waves in all horizontal directions equally (omnidirectional antennas), or preferentially in a particular direction (directional or high gain antennas). A directional antenna is a class of antenna which radiates radio wave power primarily in one direction with the radiated power decreasing with the angle from the center. Directional antennas are widely used for point to point communications (such as mesh networking) as well as fixed point to moving point (as in satellite and drone communication). Because the power radiated drops off with angle the antenna gain and beamwidth must be considered for each application. directional antennas are widely used for radio towers, GPS as well as for base stations that communicate with mobile radios, such as police and taxi dispatchers and aircraft communications.

SUMMARY

The following presents a simplified summary of the disclosure in order to provide a basic understanding of certain embodiments of this disclosure. This summary is not an extensive overview of the disclosure, and it does not identify key and critical elements of the present disclosure or delineate the scope of the present disclosure. Its sole purpose is to present some concepts disclosed herein in a simplified form as a prelude to the more detailed description that is presented later.

Provided are examples of circularly polarized directional antennas and methods of fabricating such antennas. In one aspect, which may include at least a portion of the subject matter of any of the preceding and/or following examples and aspects, an antenna comprises a plurality of radiating elements from above a conductive reflector. The antenna may also comprise a plurality of parasitic elements above the central radiating element to be driven as a parasitic system. The plurality of conducting elements extends radially outward from a central location and may be spaced equally or at various angles. The plurality of conducting elements may contain between 5 and 12 conductors. These conductors may be straight or may curve. The plurality of conductive elements may be parallel with the reflector or may curve toward or away from the reflector.

The antenna further comprises a conductive reflector. This reflector may be a solid metallic plate, a mesh, or a system of connected wires. In another aspect, an antenna is provided comprising a cylinder by which the antenna feedline extends through which is secured to the reflector. In some embodiments, the feedline is a coaxial cable.

The antenna may further comprise a cover which joins to the reflector. The plurality of conducting elements extend above the reflector, but inside of the cavity created by the cover and the reflector. The plurality of conducting elements may also be supported with a non-conductive structure.

The plurality of conducting elements may be simple wires or line traces on a PCB. The conductive elements are configured with an angle of between 10 and 80 degrees between each element. Each element may be of a different length and or width than the elements adjacent to it. The lengths and widths of these elements are defined to create a rotational pattern in the emitted or received wave. Each conducting element of the plurality of conducting elements comprises a metallic wire or trace.

In particular embodiments, the plurality of conductive elements comprises of 6 conductors. These conductors are arranged in 2 sets of 3 conductors with the lengths differing to create a rotational waveform. The length in inches, from the center of the feedline to the tip to the shortest conducting element is equal to approximately $1.92/f$; wherein f is a desired operation frequency in gigahertz (GHz). The length in inches, from the center of the feedline to the tip to the middle conducting element is equal to approximately $2.368/f$; wherein f is a desired operation frequency in gigahertz (GHz). The length in inches, from the center of the feedline to the tip to the longest conducting element is equal to approximately $2.816/f$; wherein f is a desired operation frequency in gigahertz (GHz).

Other implementations of this disclosure include corresponding devices, systems, methods, and computer programs. For instance, a system is provided comprising a receiver and an antenna as previously described. In some embodiments, the antenna is coupled to the receiver via a coaxial radio frequency (RF) connector located at a second end of the coaxial cable. In some embodiments, the coaxial cable is directly coupled to a circuit board of a receiver. These other implementations may each optionally include one or more of the following features.

In another aspect, which may include at least a portion of the subject matter of any of the preceding and/or following examples and aspects, a method for constructing an antenna is provided. A cable is inserted through a support collar (cylinder) such that the end of the cable extends through the other side of the collar. The collar is bonded to the primary side of the cable. In some embodiments, the collar is bonded directly to an SMA RF connector.

The support collar is then bonded to the reflector so that the secondary end of the coaxial cable is at the proper height above the reflector to accept the plurality of conductive elements.

A small wire or piece of metal is then bonded to the shield of the coaxial cable. The plurality of conductive elements is then bonded to the center conductor of the coaxial cable or the wire bonded to the shield of the coaxial cable. These elements may be on a PCB with 3 elements bonded to the wire connected to the coaxial cable shield, and 3 elements bonded to the center conductor of the coaxial cable.

A cover is then secured over the reflector creating a cavity by which the plurality of conducting elements is enclosed. These and other embodiments are described further below with reference to the figures.

DETAILED DESCRIPTION

Figure 1:
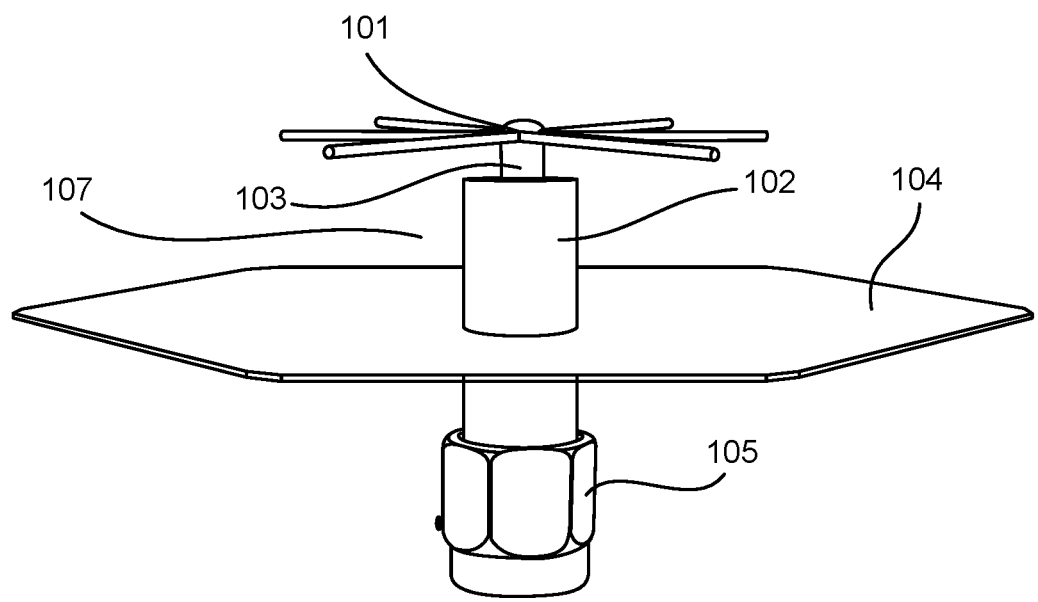
FIG. 1 is a perspective side view of a directional antenna, in accordance with one or more embodiments.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular machines, such as drones. However, it should be noted that the techniques of the present invention apply to a wide variety of different machines that may require remote wireless control. As another example, the techniques of the present invention will be described in the context of particular wireless signals, such as Wi-Fi. However, it should be noted that the techniques of the present invention apply to a wide variety of different wireless signals, including Bluetooth, infrared, line of sight transmission mechanisms, as well as various other networking protocols.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, multiple antenna structures may be connected into an antenna array which may be over a singular reflector or spaced over multiple reflectors. It should be appreciated that these implementations of the subject matter are covered within the scope of this invention.

Other techniques of the present invention are described as singular systems. An example is a system uses a processor in a variety of contexts. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Various embodiments are provided which describe a circularly polarized directional antenna. Such antennas may have implementations in a variety of fields, including, but not limited to video piloting, drone vehicles (aircraft and ground, mesh networking, and Wi-Fi applications. In various embodiments, the antenna uses a plurality of conductive elements extending radially outward above a reflector. The plurality of conductive elements may contain between 5 and 12 conductors. Such conducting elements may be wire type, printed circuit board (PCB), or a combination of both. The conducting elements may be of different lengths and widths to achieve the desired performance. The plurality of conductive elements may be curved or straight. The plurality of conductive elements may be fully encapsulated within a cover. The antenna's feedline may be a coaxial cable which may be mounted by a separate cylindrical choke incorporated into a balun. Accordingly, various embodiments described in the present disclosure provide a lightweight directional antenna that includes reduced sizing with greater bandwidth and performance that may be implemented in a variety of systems.

With reference to FIG. 1, shown is a perspective side view of an example a circularly polarized directional antenna 100, in accordance with one or more embodiments. Antenna 100 may comprise a plurality of conductive elements 101. In some embodiments, the plurality of conductive elements may be fed by a coaxial cable 103. As used herein, the sleeve choke may be referred to as a balun 102. In some embodiments, the sleeve choke 102 extends through the reflector plate 104. In some embodiments, a coaxial cable 103 is fed through the sleeve choke 102. The cable may be connected to an RF connector 105 such as an SMA male. Either the cable 103 or the RF connector 105 may be bonded to the primary side of the sleeve choke 102.

In various embodiments, cable 103 comprises a coaxial cable, such as an RG405 coaxial cable, for example. In other embodiments, cable 103 may comprise any other type of cable with the appropriate electromagnetic characteristics. In some embodiments, the cable may include a characteristic impedance between 25 and 200 Ohms. Such other cables may include an RG316 coaxial cable. In various embodiments, cable 103 may include several layers. The outermost layer may be a jacket, such as a 2.5 mm fluoropolymer jacket. The next layer may be an outer conductor or shield, such as a 2.20 mm layer of tin-soaked tin plated copper layer. The next layer may be an insulation layer, such as a 1.70 mm layer of solid extruded PTFE. The innermost layer may be an inner conductor, such as a 0.56 mm silver plated copper wire. In various embodiments, cable 103 may comprise a combination of one or more of the aforementioned layers.

The primary end of cable 103 may be coupled to a coaxial radiofrequency (RF) connector 105. For example, coaxial RF connector 105 may be a SubMiniature version A (SMA) connector. As another example, coaxial RF connector 105 may be a U.FL connector, MMCX, or any other suitable RF connector for high-frequency signals. In some embodiments, coaxial RF connector 105 may be an integral part of cable 103. In various embodiments, various types of connectors 105 may be implemented to electrically connect antenna 100 with a circuit board of a transceiver or other device. In some embodiments, cable 103 may be directly coupled to a circuit board without using a connector 105. For example, the primary end may be directly soldered to a circuit board.

In some embodiments a sleeve choke 102 may be electrically bonded to the RF connector 105. The sleeve choke 102 may be located near the center of the reflector 104. In some embodiments, the sleeve choke 102 may comprise a metallic material. For example, the sleeve choke 102 may be a brass collar, such as a 0.25" by 0.51" brass collar, for example.

The height of the plurality of conductive elements 101 above the reflector 104 may be changed or adjusted to change the gain, SWR or axial ratio of the antenna 100. The area 107 between the plurality of conductive elements 101 and the reflector 104 may be air, an insulator such as plastic or PCB material or a combination of these.

Figure 2:
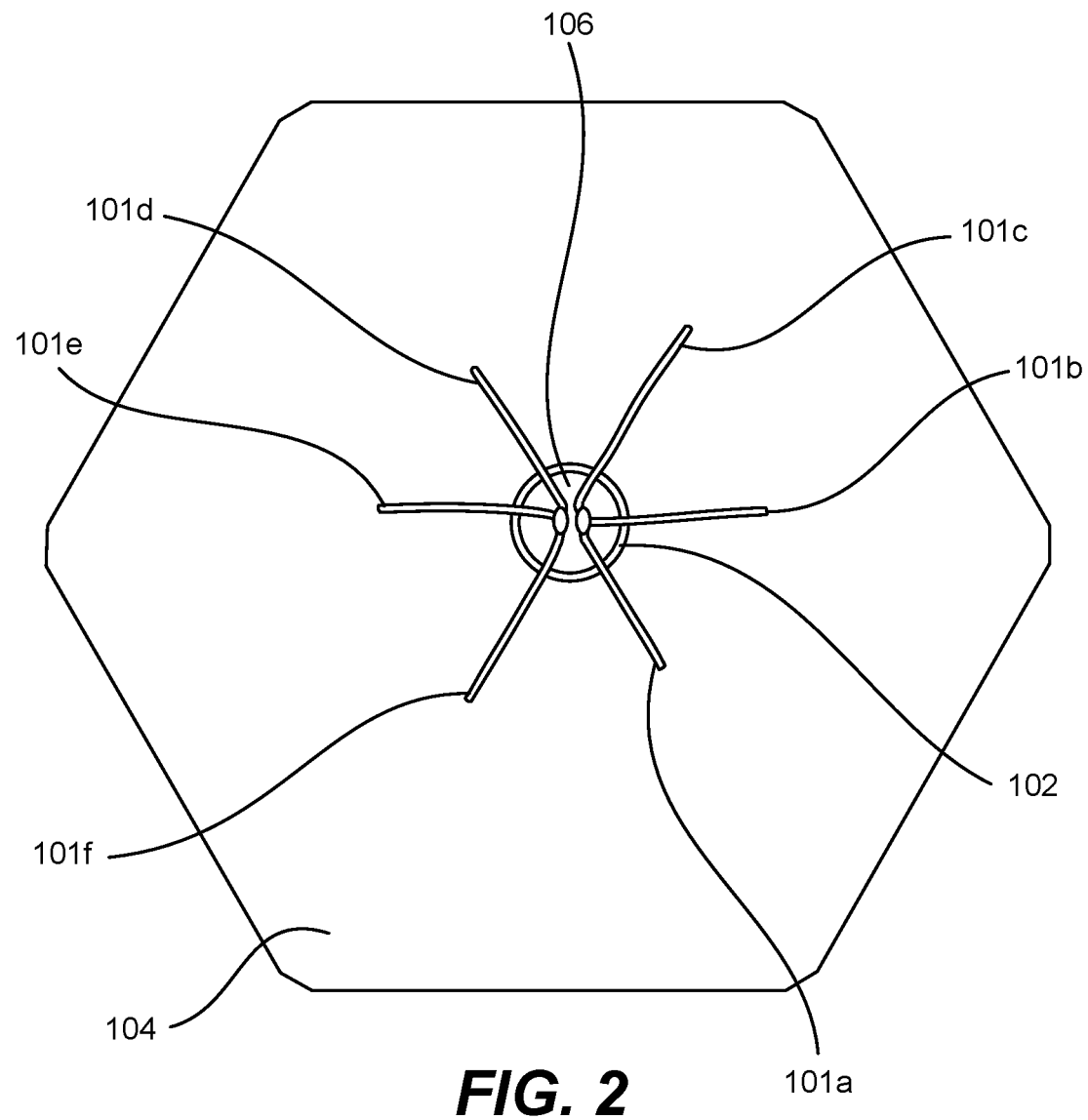
FIG. 2 is a perspective top view of a directional antenna, in accordance with one or more embodiments.

With reference to FIG. 2, shown is a perspective top-down view of antenna 100 to better illustrate the internal configuration of components. The plurality of conductive elements 101 is comprised of 5 or more conducive elements. In specific embodiments, the number of conductive elements in the plurality of conductive elements 101 is six. The plurality of conductive elements may comprise conductors of different lengths and widths or diameters.

In specific embodiments, plurality of conductive elements 101 may be comprised of 3 or more similar pairs of conductors approximately 180 degrees apart. Each conductive element pair is comprised of one conductor electrically bonded to the coaxial cable 103 center conductor and the opposite element in the pair electrically bonded to the shield of the coaxial cable 103.

In specific embodiments, a right hand circularly polarized (RHCP) systems is created. The primary conducting element pair comprised of 101a and 101d, are shorter in length. The secondary conducting elements comprised of 101b and 101e are longer in length than the primary element pair (101a and 101d), but shorter than the tertiary pair of conductive elements (101c and 101f) The tertiary conducting element pair comprised of 101c and 101f are longer in length. The plurality of conductive elements are physically separated by an angle corresponding to their respective lengths and widths. In specific embodiments, the angle between each element in the plurality of conductive elements is 60 degrees. The order of elements in the plurality of conductive elements 101 follows a counter-clockwise direction beginning with 101a and continuing 101b, 101c, 101d, 101e, 101f.

In some embodiments, the relative positions of the elements may be reversed from counter-clockwise to a clockwise direction so that they create a left-hand circularly polarized (LHCP) rotational signal.

In some embodiments the lengths of the primary conductive elements 101a and 101d for thin conductors mounted in free air may be estimated by the following equation:

$$L=1.92/f \qquad \text{EQ1:}$$

Where L is length in inches and f is frequency in GHz

In some embodiments the lengths of the secondary conductive elements 101b and 101e for thin conductors mounted in free air may be estimated by the following equation:

$$L=2.368/f \qquad \text{EQ2:}$$

Where L is length in inches and f is frequency in GHz

In some embodiments the lengths of the tertiary conductive elements 101c and 101f for thin conductors mounted in free air may be estimated by the following equation:

$$L=2.816/f \qquad \text{EQ3:}$$

Where L is length in inches and f is frequency in GHz

In some embodiments the plurality of conductive elements 101 above the reflector 104 mounted in free air may be estimated by the equation:

$$H=1.96/f \qquad \text{EQ4:}$$

Where H is height in inches and f is frequency in GHz

In particular embodiments, the lengths of the plurality of conductive elements 101 may be different than equations EQ1, EQ2, and EQ3 by changing the height above the reflector 104, changing the diameter or width of the conductors, or by using a dielectric material such as a PCB. The lengths of the plurality of conductive elements may deviate from the equations by as much as 60% to account for changes in height over reflector as well as dielectric material in the space between the reflector and elements 107.

The sleeve choke 102, the annular cavity 106, along with the coaxial cable 103, forms the balun. The balun converts between a balanced signal (two signals working against each other where ground is irrelevant) and an unbalanced signal (a single signal working against ground or pseudo-ground), and affecting the tuning of the antenna to a specific desired frequency and axial ratio.

The annular space 106 between the interior surface of sleeve choke 102 and the cable 103 may be filled with material or air. Such material may be used to further secure sleeve choke 102 to cable 103 and/or change the effective length of the balun. For example, material in cavity 106 may include a combination of one or more of air and insulator, such as polyamide plastic or polyamide glue. In some embodiments, the material comprising polyamide plastic may comprise a dielectric material which may affect the effective balancing effect. As such, the amount of material used within the cavity 106 may affect the overall length and/or width of the sleeve choke 102.

Figure 3:
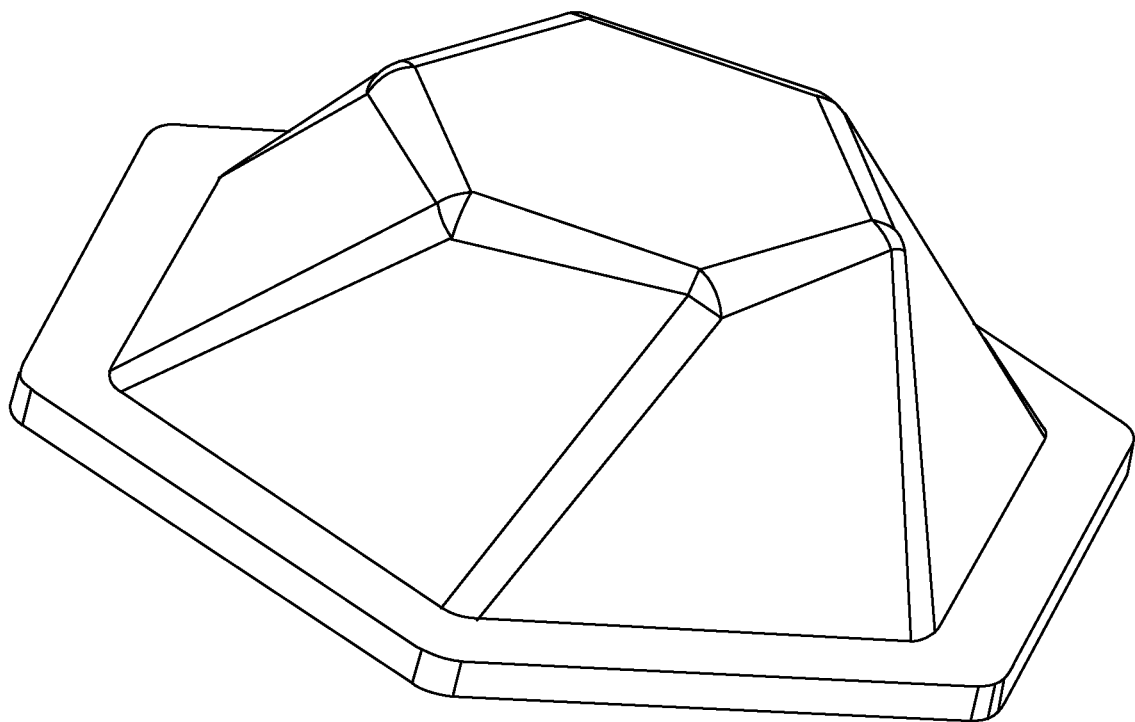
FIG. 3 illustrates a perspective view of an example protective casing for a rotationally phased directional antenna in accordance with one or more embodiments.

FIG. 3 illustrates a perspective view of an example protective casing 150 for a circularly polarized directional antenna 100, in accordance with one or more embodiments. In various embodiments, protective casing 150 may be constructed from a non-conductive material, such as plastic. In various embodiments, the components of the protective casing 150 may be manufactured by various manufacturing processes, such as traditional machining, injection molding, 3D printing, laser cutting, or various other manufacturing processes.

The protective casing 150 for a circularly polarized directional antenna 100 may cover all or only a portion of the antenna. In various embodiments, the protective casing 150 covers the plurality of conductive elements 101 and the front side of the reflector 104.

Figure 4:
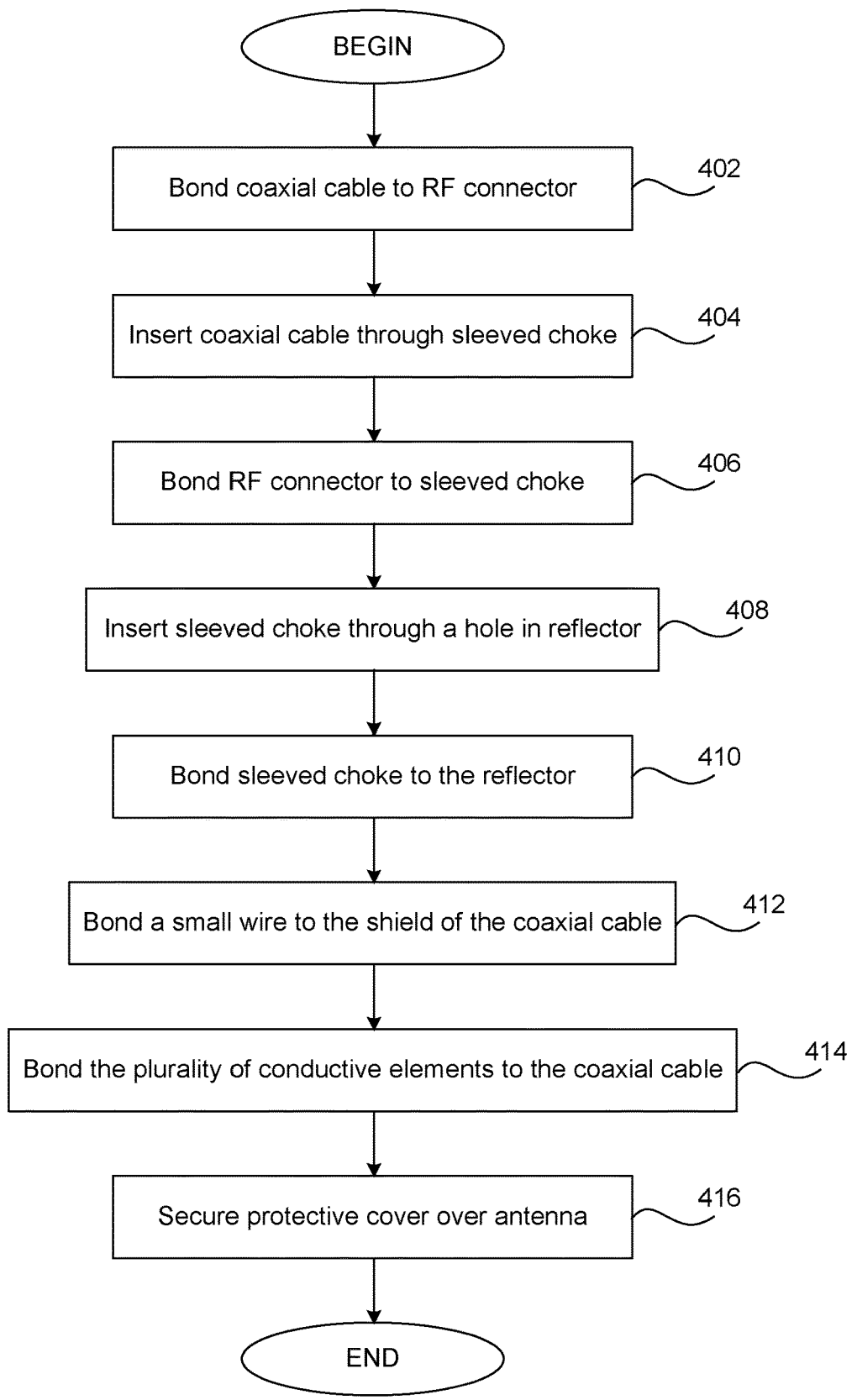
FIG. 4 is a flow diagram of a method of constructing a rotationally phased directional antenna in accordance with one embodiment.

FIG. 4 is a flow diagram of a method of constructing the circularly polarized antenna 100. In various embodiments, the coaxial cable 103 is bonded to the RF connector 105 at step 402. At step 404 the coaxial cable 103 is extended through the sleeved choke 102. At step 406 the RF connector 105 is then bonded to the primary side of the sleeve choke 102. At step 408 the sleeved choke 102 with partially contained coaxial cable 103 is extended through the reflector 104. At step 410 sleeved choke 102 is bonded to the reflector 104. At step 412 a small wire is bonded to the shield of the coaxial cable. At step 414 the plurality of conductive elements 101 is bonded to the coaxial cable 103. Step 416 protective cover 150 is placed over the reflector 104 and bonded.

In various embodiments, a partial protective casing 150 covers only a portion of the circularly polarized antenna 100. In various embodiments, the partial protective casing completely encapsulates the plurality of conductive elements.

Figure 5:
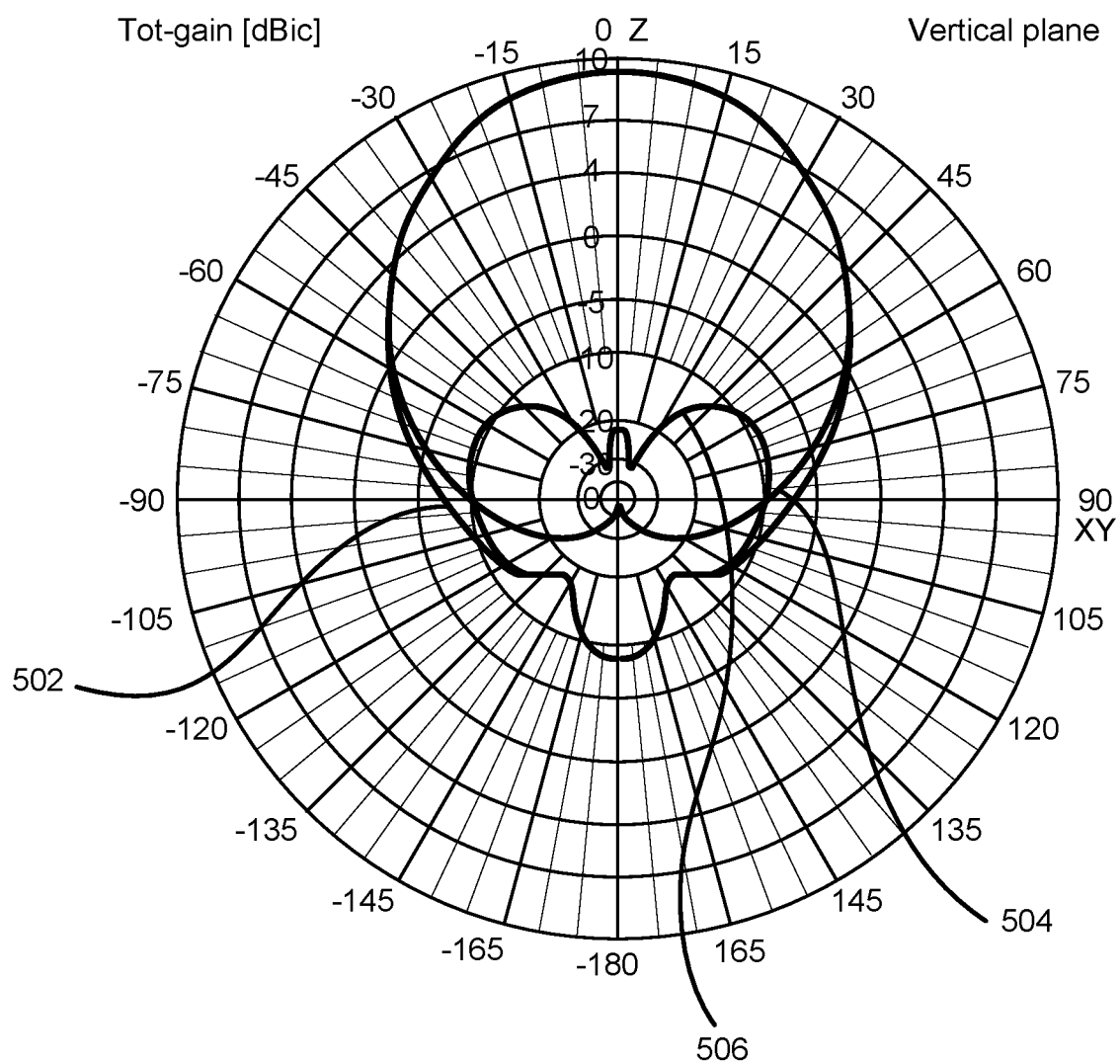
FIG. 5 is an example radiation pattern graph of a directional antenna in accordance with one or more embodiments.

FIG. 5 illustrates an example of a radiation pattern graph in accordance with one or more embodiments. The graph shows a radiation pattern of an example right hand circularly polarized configuration of antenna 100. The graph shows the total gain 502 (outermost pattern), dominant rotation pattern 504 (middle pattern), and recessive pattern 506 (innermost pattern). The conducting elements in the plurality of conducting elements may be arranged in reverse fashion (clockwise direction) to change the dominant pattern 504 and recessive pattern 506. Additionally, the location of the plurality of conducting elements will change the pattern.

Although many of the components and processes are described above in the singular for convenience, it will be appreciated by one of skill in the art that multiple components and repeated processes can also be used to practice the techniques of the present disclosure.

What is claimed is:

1. An antenna comprising:
a plurality of conductive elements above a reflector,
wherein the plurality of conductive elements is connected to a centrally located feedline and extend radially outward parallel to the reflector
and a balun including:
a conductive sleeve choke having a primary side;
a coaxial cable having a shield,
wherein the shield or a radio frequency (RF) connector is bonded to the primary side of the conductive sleeve choke; and
wherein the sleeve choke extends through the reflector; and
a non-conductive protective cover, wherein the plurality of conducting elements is located within a space between said non-conductive protective cover and said conductive reflector, wherein each conducting element of the plurality of conducting elements comprises a copper wire or trace.

2. The antenna of claim 1 wherein each of the conductive elements in the plurality of conductive elements is of various lengths and widths thereby creating a rotational waveform.

3. The antenna of claim 1, wherein the reflector is comprised of a conductive material.

4. The antenna of claim 1, wherein the plurality of conducting elements is located within a printed circuit board that is bonded to the coaxial cable.

5. The antenna of claim 1, wherein the plurality of conducting elements include individual wires that are bonded to the coaxial cable.

6. The antenna of claim 1, wherein the plurality of conducting elements includes six conducting elements.

7. The antenna of claim 1, wherein each conductive element of the plurality of conductive elements includes a metallic wire or metallic trace.

8. The antenna of claim 1 wherein each conductive element in the plurality of conductive elements is one of straight or curved.

9. A system comprising:
a transmitter or receiver; and
an antenna, the antenna comprising:
a protective casing comprising non-conductive material;
a plurality of conducting elements extending radially outward, each conducting element of various lengths and widths extending outward in parallel with a reflector bonded to a coaxial cable; and
a balun having:
a sleeved choke passing through the reflector bonded to the coaxial cable or radio frequency (RF) connector.

10. The system of claim 9, wherein the antenna is coupled to the receiver via a coaxial RF connector located at the primary end of the cable.

11. The system of claim 9, wherein each conductive element of the plurality conductive elements extends radially outward and wherein the plurality of conductive elements is arranged from short conductive element to long conductive element to receive a rotational wave.

12. The antenna of claim 9, wherein each conducting element of the plurality of conducting elements is located within a space between said protective casing and the reflector.

* * * * *